(12) United States Patent
Fourie

(10) Patent No.: US 10,670,062 B1
(45) Date of Patent: *Jun. 2, 2020

(54) MULTI-LAYER LAMINATE LOAD RING

(71) Applicant: LOON LLC, Mountain View, CA (US)

(72) Inventor: Daniel Henry Fourie, Sunnyvale, CA (US)

(73) Assignee: Loon LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/261,079

(22) Filed: Jan. 29, 2019

Related U.S. Application Data

(63) Continuation of application No. 15/053,505, filed on Feb. 25, 2016, now Pat. No. 10,253,795.

(51) Int. Cl.
  *F16B 5/08* (2006.01)
  *B64B 1/42* (2006.01)

(52) U.S. Cl.
  CPC ............ *F16B 5/08* (2013.01); *B64B 1/42* (2013.01); *Y10T 29/49826* (2015.01); *Y10T 403/477* (2015.01)

(58) Field of Classification Search
  CPC . B64B 1/40; B64B 1/42; F16B 5/0004; F16B 5/0056; F16B 5/08; Y10T 29/49826; Y10T 403/47; Y10T 403/477
  USPC ............ 403/265, 270; 244/31, 127; 29/428
  See application file for complete search history.

(56) References Cited

U.S. PATENT DOCUMENTS

| | | |
|---|---|---|
| 939,644 A | 11/1909 | Tilghman |
| 2,526,719 A | 10/1950 | Winzen |
| 2,728,540 A | 12/1955 | Ebneter |
| 4,055,966 A | 11/1977 | Fredericks |
| 4,264,311 A | 4/1981 | Call |
| 5,019,015 A | 5/1991 | Wasserfuhr |
| 5,170,967 A | 12/1992 | Hamamoto et al. |
| 6,554,713 B2 | 4/2003 | Sunada |
| 8,186,625 B2 | 5/2012 | De Jong |
| 8,757,919 B2 | 6/2014 | Samuelsson |
| 9,027,874 B1 | 5/2015 | Roach |
| 9,296,461 B1 | 3/2016 | Roach |
| 9,771,983 B2 | 9/2017 | Marks |
| 9,845,141 B2 | 12/2017 | Sehnert |
| 2006/0211501 A1 | 9/2006 | Corey |
| 2013/0336811 A1 | 12/2013 | Muller |
| 2015/0222151 A1 | 8/2015 | Semken |
| 2016/0341255 A1 | 11/2016 | Kummer |
| 2017/0363153 A1 | 12/2017 | Sowa |

*Primary Examiner* — Josh Skroupa
(74) *Attorney, Agent, or Firm* — Botos Churchhill IP Law

(57) ABSTRACT

A laminated load ring for a balloon assembly includes a plurality of ring stacking units stacked one on top of the other. Each of the ring stacking units can include a main body having a central opening, a plurality of arms, and at least one weld line. The plurality of arms may each extend away from the main body around a circumference of the main body. The at least one weld line can be formed on the main body. The plurality of arms of the plurality of ring stacking units may be aligned with one another. The weld line of each of the plurality of ring stacking units may be offset from the weld line of a directly adjacent ring stacking unit in a direction extending around the circumference of the laminated load ring.

20 Claims, 13 Drawing Sheets

MULTI-LAYER LAMINATE LOAD RING

CROSS-REFERENCE TO RELATED APPLICATIONS

This application is a continuation of U.S. patent application Ser. No. 15/053,505, filed on Feb. 25, 2016, now issued as U.S. Pat. No. 10,253,795, the disclosure of which is incorporated herein by reference.

BACKGROUND OF THE INVENTION

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. As such, the balloons include a number of components, such as a flexible envelope made of material that may be configured in sections or lobes to create a "pumpkin" or lobed balloon, a plurality of tendons to support the lobes and a termination plate or load ring for securing the tendons to the balloon. The load ring functions to support an anticipated tendon load created during balloon envelope inflation by transferring the load of one tendon to the opposite tendon on the other side of the balloon apex through hoop stress in the load ring.

SUMMARY OF THE INVENTION

According to aspects of the disclosure, a laminated load ring for a balloon assembly includes a plurality of ring stacking units stacked one on top of the other. Each of the ring stacking units includes a main body that has a central opening, a plurality of arms that each extends away from the main body around a circumference of the main body, and at least one weld line formed on the main body. The plurality of arms of the plurality of ring stacking units may be aligned with one another, and the weld line of each of the plurality of ring stacking units may be offset from the weld line of a directly adjacent ring stacking unit in a direction extending around the circumference of the laminated load ring.

In one embodiment of this aspect, each of the ring stacking units may be manufactured from a fiber-reinforced material. The majority of the fibers in the ring stacking unit may be oriented in a lateral direction that extends in a direction parallel to a top surface of the ring stacking unit. The at least one weld line of each of the plurality of ring stacking units can be spaced apart from the at least one weld line of the directly adjacent ring stacking unit by a same distance. Each of the ring stacking units can further include at least one gate tab that is positioned within the central opening. The at least one gate tab of each of the plurality of ring stacking units can be offset by at least five degrees from the at least one gate tab of the directly adjacent ring stacking unit in a direction extending around the circumference of the laminated load ring. The main body can have a thickness of at least 0.050 inches.

According to another embodiment of this aspect, a thickness of each ring stacking unit is at least 0.060 inches.

According to another embodiment of this aspect, each of the plurality of ring stacking units can have a circumferential tensile strength of at least 100 MPa. A sum of the strength of each of the plurality of ring stacking units in the laminated load ring can be less than the overall strength of the assembled laminated load ring.

According to another embodiment of this aspect, the plurality of ring stacking units may be bonded together. In one example, an adhesive layer may be provided between each of the plurality of ring stacking units. In another example, the plurality of ring stacking units may be additionally or alternatively ultrasonically welded together.

According to another aspect of the disclosure, an in-process laminated load ring unit for a balloon assembly includes a plurality of identical ring stacking units stacked one on top of the other and a plurality of gates tabs. Each of the ring stacking units may be manufactured from a fiber-reinforced material, wherein each of the ring stacking units includes a main body having a central opening and an interior edge forming a periphery around the central opening. The fibers in the fiber-reinforced material may be oriented in substantially the same direction. The plurality of gates tabs may extend away from the interior edge. Each of the plurality of gate tabs may be offset from a directly adjacent gate tab of the plurality of gate tabs in a direction extending around the circumference of the laminated load ring. In one example, the gate tabs may be evenly spaced apart from one another. In another example, each of the plurality of gate tabs can extend continuously from the main body. In still another example, the gate tabs may have a thickness that is a same thickness as a thickness of the main body.

In accordance with another embodiment of this aspect, a thickness of each ring stacking unit is at least 0.060 inches.

In yet another embodiment of this aspect, a majority of the fibers in the ring stacking unit are oriented in a lateral direction that is parallel to a top surface of the ring stacking unit.

A method of forming a laminated load ring according to aspects of the disclosure includes providing a plurality of ring stacking units, stacking a second ring stacking unit of the plurality of ring stacking units on top of a first ring stacking unit; and arranging the first and second ring stacking units. Each of the ring stacking units may be substantially similar in shape and size. Each of the ring stacking units may further include a main body having an opening, an interior edge extending around the opening, a plurality of arms extending around an exterior edge of the ring stacking unit, and a weld line in the main body of the ring stacking unit. The first and second ring stacking units may be arranged so that the weld line of the second ring stacking unit is offset relative to the first ring stacking unit in a direction extending around a circumference of the ring stacking unit.

In another example of this aspect, the step of providing further includes forming a shape of plurality of ring stacking units from an injection mold filled with a fiber-reinforced material. Each of the fibers in the fiber-reinforced material is oriented in a same direction when the injection mold is filled with the fiber reinforced material.

The method of claim 18, wherein the plurality of arms of the second ring stacking unit are aligned with the plurality of arms of the first stacking unit, the method further comprising stacking a third ring stacking unit of the plurality of ring stacking units on top of the second ring stacking unit so that the weld line of the third ring stacking unit does not align with the weld line of the second ring stacking unit.

DETAILED DESCRIPTION OF THE DRAWINGS

Figure 1:
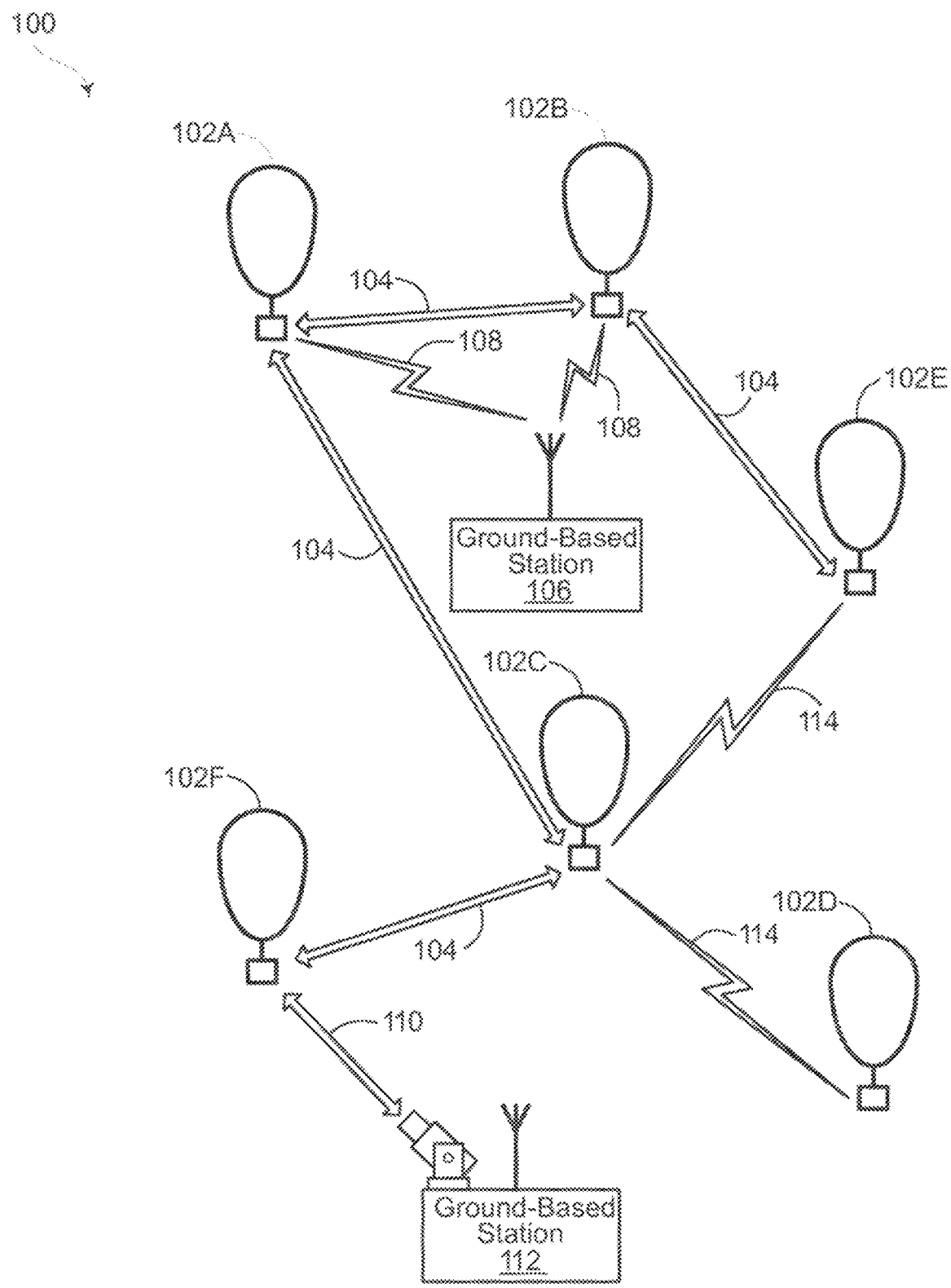
FIG. 1 is a functional diagram of a system in accordance with aspects of the present disclosure.

Aspects of the disclosure are directed to a cost-effective and light-weight multi-layer laminate load ring for a balloon envelope of a balloon assembly. Typically, load rings are metal rings designed to be positioned on top of a balloon envelope and connected to the balloon tendons. A typical load ring is formed from a large monolithic piece of metal that can both efficiently distribute the tendon load and withstand the extreme pressure of the balloon. However, metal load rings can be heavy, reducing the weight of a payload that the balloon is able to effectively support, as well as extremely expensive to manufacture.

To address these shortcomings, rather than using metal, a load ring may be a laminated modular ring made up of several stacked layers of thin injection molded plastic rings or individual ring stacking units, which together form a unitary laminated load ring. The fibers of each laminate ring may be oriented to generally face in the same direction to increase the strength of each individual ring. Furthermore, when stacking each of the individual rings, the rings may be offset from the next adjacent ring in a direction extending along the circumference of the ring and additionally or alternatively at a consistent angle. This stacked and offset configuration reduces the likelihood of weakened locations on the load ring caused by the formation of weld lines and gates during the injection molding process.

The load ring may have the overall shape of a circular ring and include a circular central opening. A plurality of tendon receiving arms may be evenly-spaced around the perimeter of the load ring. Each of the arms may include apertures to receive bolts. Tendons may be attached to the load rings.

Each individual ring stacking unit can be manufactured to have the same uniform shape and size. When stacked together, the individual ring stacking units can form the overall shape of the load ring. An example ring stacking unit can therefore also be ring-shaped with a central opening and a plurality of arms extending around the perimeter of the stacking ring. The ring stacking unit may have a thickness extending between the top surface and bottom surface of the stacking unit.

The individual ring stacking units can be injection molded and formed from an injection mold that includes two or more components joined together to form the shape of a ring. For example, the injection mold may be comprised of four primary mold components that together form the circular shape and arms of the ring stacking unit, but less than four or greater than four components may be utilized. The injection mold can include a central opening, which forms the central opening of the ring stacking unit. Four gates may be provided within the central opening of the mold. Each of the four gates may intersect one another at the center of the central opening. The gates can therefore extend from the center of the central opening to a point along the mold. In this example, the four gates are equally spaced around the circumference of the mold.

The material used to form the individual ring stacking units and that is injected into the mold may be a fiber reinforced plastic material, although other types of material can also be used. The reduced thickness of the individual ring stacking unit allows for fibers in the material to achieve an optimal orientation. This is because the thickness of the injection mold does not provide the room for the fibers to rotate and move through multiple axes. Substantially all of the fibers can therefore be oriented in substantially the same direction. In one example, the length or longest dimension of the fibers may extend laterally along the same plane as the top and bottom surfaces of the ring stacking unit.

At the conclusion of the injection molding process, the individual ring stacking unit can be removed from the injection mold. The resulting individual ring stacking unit will be in the overall shape of the load ring.

An in-process load ring unit can be formed prior to complete formation of the laminated load ring. During assembly of the load ring, multiple individual ring stacking units can be stacked one on top of the other to form an intermediate or in process unit. During assembly, the weld lines of each ring stacking unit may be offset by a predetermined number of degrees. Each of the subsequent ring stacking units can also be rotated the distance between a first and second arm so that the arms of each of the ring stacking units are aligned with one another. This further allows for incremental rotation of the weld lines around the laminated ring. Any number of additional stacking units may be added to form the completed laminated load ring.

The individual ring stacking units may be bonded together to ensure they remain secured together. Various materials and bonding methods can be used, such as use of an adhesive material or welding.

Once the desired number of ring stacking units has been assembled together, gate tabs extending around the peripheral edge of the central opening can be removed to form the completed load ring. In other examples, the gate tabs can be removed from the individual ring stacking units prior to the individual ring stacking unit being stacked to form the completed and laminated load ring. Additional finishing procedures can be further completed, such as sanding the edges of the ring stacking unit to form smooth edges, removing excess adhesive, and the like.

The load ring with offset weld lines can have a strength that is greater than the laminated load ring wherein each of the weld lines of the ring stacking units are aligned with one another. This is due, in part, to the fact that the fibers in each ring stacking unit may be oriented in the same or similar direction, which increases the overall strength of laminated load ring when each of the individual ring stacking units are bonded together. Additionally, because the weld lines of each adjacent stacking unit are not aligned with one another, the locally weak points of one ring stacking unit are offset from the locally weak point of an adjacent ring stacking unit. In this regard, the locally weak point of one ring can be strengthened by the adjacent ring stacking unit which overlies the locally weak point. Finally, the load ring can be significantly lighter than metal load rings while maintaining strength properties due to the configuration.

Example System

FIG. 1 depicts an example system 100 in which a balloon assembled according to aspects herein may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." The balloon network 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
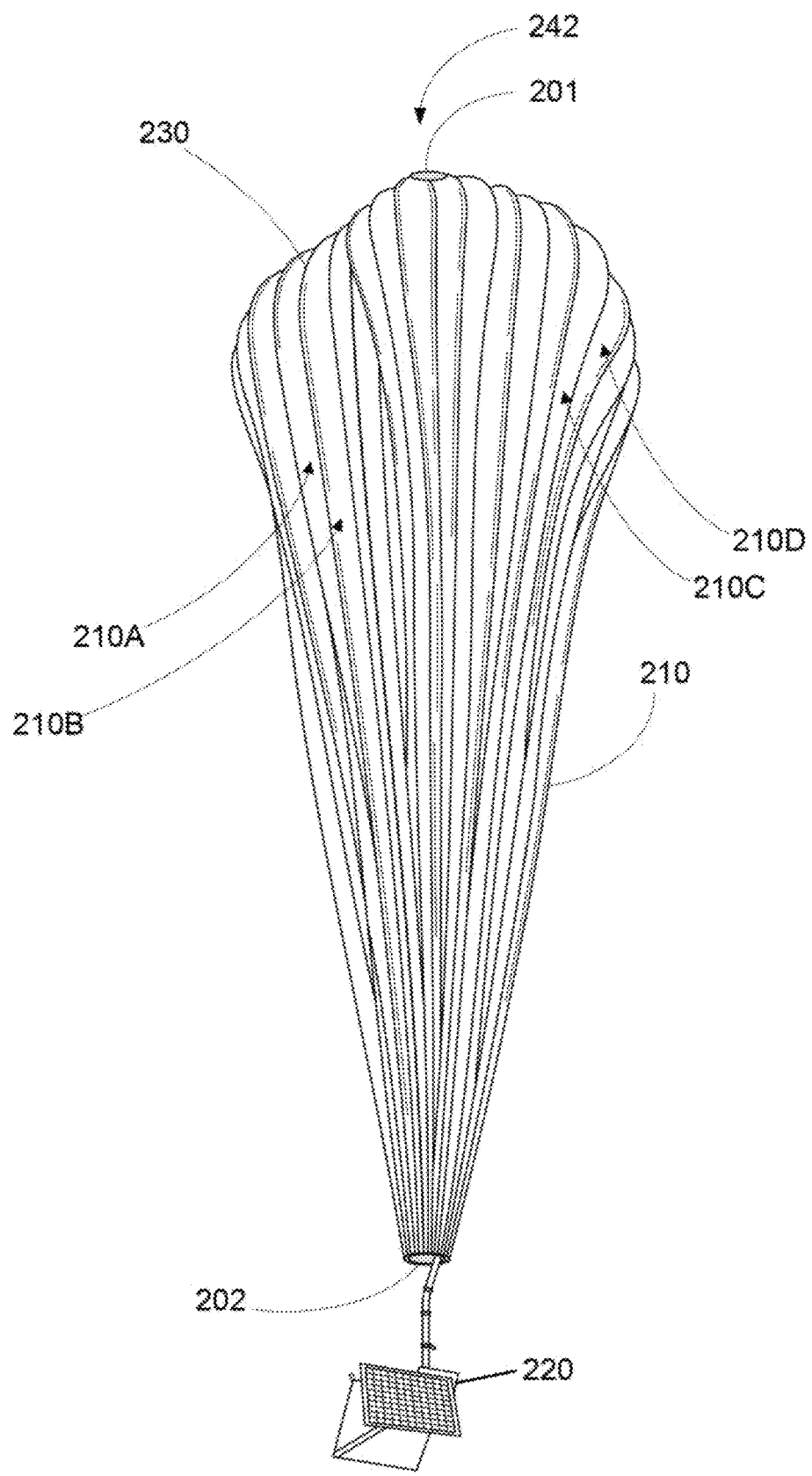
FIG. 2 is a view of an example of a balloon in accordance with aspects of the present disclosure.

FIG. 2 is an example balloon 200, which may represent any of the balloons of balloon network 100. As shown, the balloon 200 includes a balloon envelope 210 comprised of envelope gores 210A, 210B, 210C, 210D, a payload 220 and a plurality of tendons 230 attached to the envelope 210 and a termination plate 201 at the apex 242 of the balloon.

The balloon envelope 210 may take various forms. In one instance, the balloon envelope 210 may be constructed from materials such as polyethylene that do not hold much load while the balloon 200 is floating in the air during flight. Additionally, or alternatively, some or all of balloon envelope 210 may be constructed from a highly flexible latex material or rubber material such as chloroprene. Other materials or combinations thereof may also be employed. Further, the shape and size of the balloon envelope 210 may vary depending upon the particular implementation. Additionally, the balloon envelope 210 may be filled with various gases or mixtures thereof, such as helium, hydrogen or any other lighter-than-air gas. The balloon envelope 210 is thus arranged to have an associated upward buoyancy force during deployment of the payload 220.

The payload 220 of balloon 200 is affixed to the envelope by a connection such as a cable (not shown). The payload 220 may include a computer system (not shown), having one or more processors and on-board data storage. The payload 220 may also include various other types of equipment and systems (not shown). For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. In this example, balloon envelope 210 is comprised of a plurality of envelope gores 210A-210D.

Pressurized lift gas within the balloon envelope 210 may cause a force or load to be applied to the balloon 200. In that regard, the tendons 230 provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Each tendon may be formed as a fiber load tape that is adhered to a respective envelope gore. Alternately, a tubular sleeve may be adhered to the respective envelopes with the tendon positioned within the tubular sleeve. In some examples, the tendons 230 may be run from the apex to the bottom of the balloon envelope 210 in order to pick up the load. In normal operations, these tendons 230 need to be kept in place during balloon flight in order to continue to handle the load and maintain the shape of the balloon envelope.

Top ends of the tendons 230 may be coupled together using a type of assembly, such as a termination plate assembly 201, which may be positioned at the apex of balloon envelope 210. In some examples, bottom ends of the tendons 230 may also be connected to one another. For example, a corresponding termination plate 202 may be disposed at a base or bottom of the balloon envelope 210. The termination plate 201 at the apex may be the same size and shape as the termination plate 202 at the bottom of the balloon envelope 210. Both termination plates may include corresponding components for attaching the tendons 230 thereto. In other examples, the mouth of the bottom of the balloon envelope 210 may remain open during use, such that the mouth is not sealed to a termination plate or other device.

Figure 3:
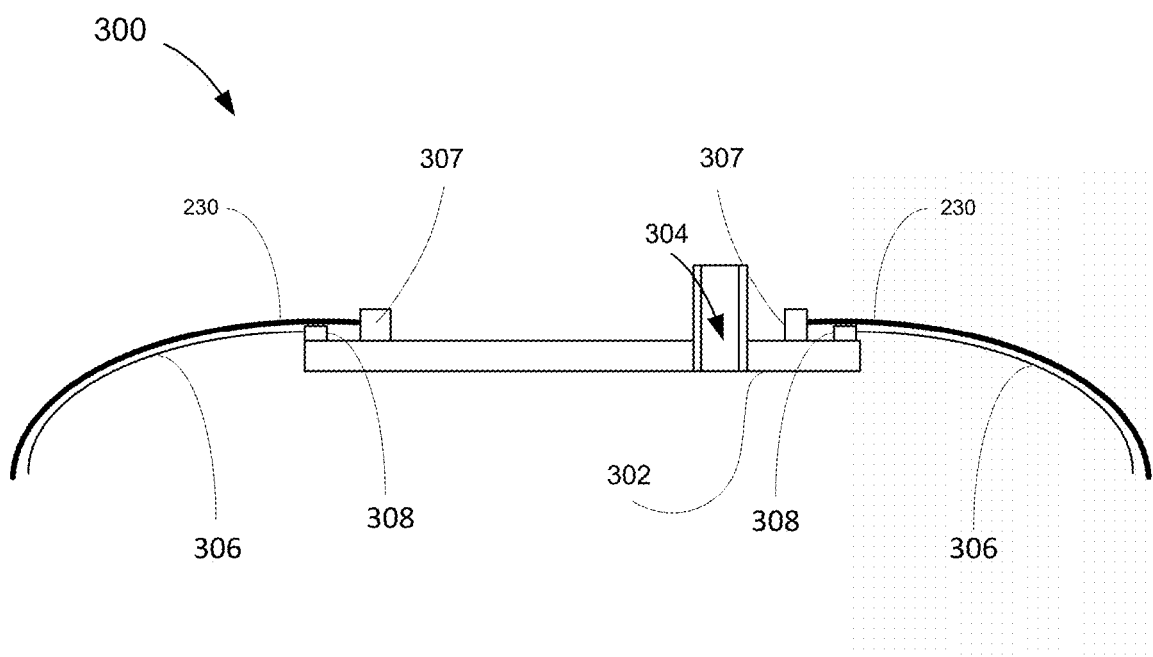
FIG. 3 is a cross-sectional view of an example of a termination plate assembly that includes a load ring in accordance with aspects of the present disclosure.

FIG. 3 is an example of a termination plate assembly 300. Here, a side cut-way view of the termination plate assembly 300 is shown. In this example, the termination plate assembly includes a number of components, such as a plate body 302 having an opening including a fill port 304, and a plurality of tendons 230 overlying the balloon gores 306 that are attached to termination plate body 302.

Plate body 302 of the termination plate assembly 300 may be made of a lightweight yet rigid material, such as a type of plastic or other types of similar materials. Because the plate body 302 may not itself be load bearing, the termination plate assembly 300 may include a load bearing mechanism for supporting the tendons attached to the assembly. As shown, the termination assembly 300 may include a load ring 307 that can be coupled to each tendon 230 in order to secure that tendon to the assembly 300. In some aspects, the load ring 307 can be formed from a plurality of laminated rings that are strong enough to support the load carried by the tendons. This load ring 307 may be configured to reach around the plate body 302 of termination assembly 300 in a manner so that arms on the load ring 307 can couple each tendon to the plate.

Example Load Ring

Figure 4:
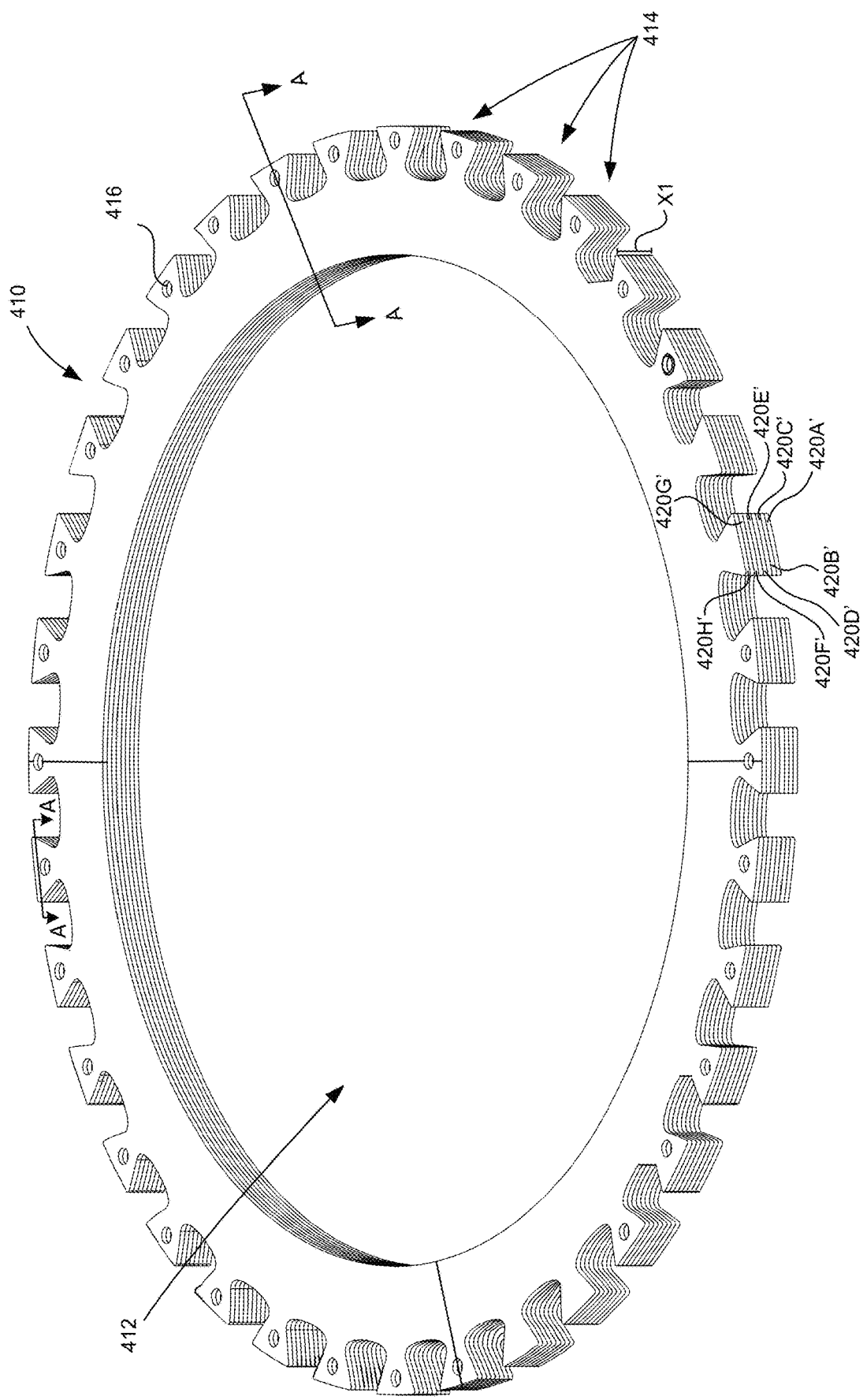
FIG. 4 is an example laminate load ring according to aspects of the present disclosure.

FIG. 4 is an example of a load ring 410 (corresponding to load ring 307) according to an aspect of the disclosure. The load ring 410 may have the overall shape of a circular ring and include a circular central opening 412. A plurality of tendon receiving arms 414 may be evenly-spaced around the perimeter of the load ring 410. Each of the arms 414 may include apertures 416 which can be sized to receive bolts (not shown) that extend through the aperture 416 and can be used to attach other components of the balloon assembly there to. In one example, the thickness X1 of the load ring may be at least 0.5 inches, but can range from 0.25 to 1.25 inches. In other examples, any desired thickness may be used. The load ring 410 may have a circumferential tensile strength of at least 280 MPa. In other examples, the tensile strength may fall within the range of 100 MPa-500 MPa.

The load ring 410 may be a laminated modular ring made up of several stacked layers of individual ring stacking units. As shown, for example, in FIG. 4, ring stacking units 420A'-420I' are stacked one on top of the other to form a fully assembled and completed load ring 410. The ring stacking units 420A'-420I' can each be manufactured to have the same uniform shape and size so that when stacked together, the collective ring stacking units 420A'-420I' form the overall shape of the load ring 410. As will be discussed in more detail herein, each of the ring stacking units 420A'-420H' can have a thickness that is less than the thickness X1 of the fully assembled load ring 410.

One or more of the ring stacking units that form the load ring 410 can be manufactured through an injection molding process. For example, as shown in the schematic view of FIG. 5, an injection mold 430 can be provided to form the shape of a single ring stacking unit, such as ring stacking unit 420A (shown in FIG. 6). The injection mold 430 may include a central opening 432, which will become the central opening 412A (shown in FIG. 6) of the ring stacking unit 420A. Cavities 417 and shapes within the mold will help to form the shape of the desired load ring 410. As shown, the cavities 417 create the shape of the body of an individual ring stacking unit, such as the ring stacking unit 420A, including the ring arms of the individual ring stacking unit. Gates may be provided within the central opening of the mold to facilitate movement of the material forming the ring stacking unit into the injection mold 430. In this example, four gates 434, 436, 438, and 440 are provided. Each of the four gates 434, 436, 438, and 440 may intersect one another at what will become the center 442 of the central opening 412A. The four gates 434, 436, 438, and 440 may be equally spaced around the circumference of the opening of the mold 430 at approximately forty-five degrees away from one another. In other examples, there may be a fewer number of gates or a greater number of gates. Additionally or alternatively, one or more of the gates may not be evenly spaced around the mold.

During the injection molding process, a nozzle 444 positioned at the intersection of the four gates 434, 436, 438, and 440 may be used to introduce the material forming the ring stacking unit 420 into the mold 430. The material forming the ring stacking unit 420A can flow through the nozzle 444 into each of the four gates 434, 436, 438, and 440. The material will continue to flow through the gates 434, 436, 438, and 440 and into respective gate entrances 434A, 436A, 438A, 440A positioned at the interior edge 419 of the injection mold 430. Once the material flows through the gate entrances 434A, 436A, 438A, 440A, the material will dispense throughout the mold 430 until two flow fronts meet at a point generally between two gate entrances. As will be discussed herein, the point where the two flow fronts meet can cause weld lines to form on the ring stacking unit. The material used to form the individual ring stacking units 420 and that is injected into the injection mold 430 can include a fiber reinforced plastic material, such as a high strength glass-fiber filled nylon-based plastic may be used. Other materials that can be used to manufacture the ring stacking unit can include glass-fiber filled, carbon-fiber filled, ceramic-fiber filled nylon-based plastic, or any other high performance thermoplastic.

At the conclusion of the injection molding process, the injection mold may be removed away from the final ring stacking unit 420A. The resulting ring stacking unit 420A can have the overall shape of the load ring 410, but a lesser thickness. As shown, for example, in FIG. 6, the ring stacking unit 420A has the same shape as the completed load ring 410 (FIG. 4.) The ring stacking unit 420A can be circular in shape and include a central opening 412A and a plurality of arms 414A extending around the circumference of the ring stacking unit 420A, including the first and second ring arms 414A1 and 414A2. The ring stacking unit 420A may have a thickness X2 extending between the top surface 422A and bottom surface 424A of the ring stacking unit 420A. (See also FIG. 7.) The ring stacking unit 420A may have a thickness X2 that is at least 0.060 inches, but may range from 0.040 to 0.090 inches. In other examples, the thickness of the ring stacking unit need only be less than the thickness X1 of the completed load ring 412 shown in FIG. 4.

Figure 5:
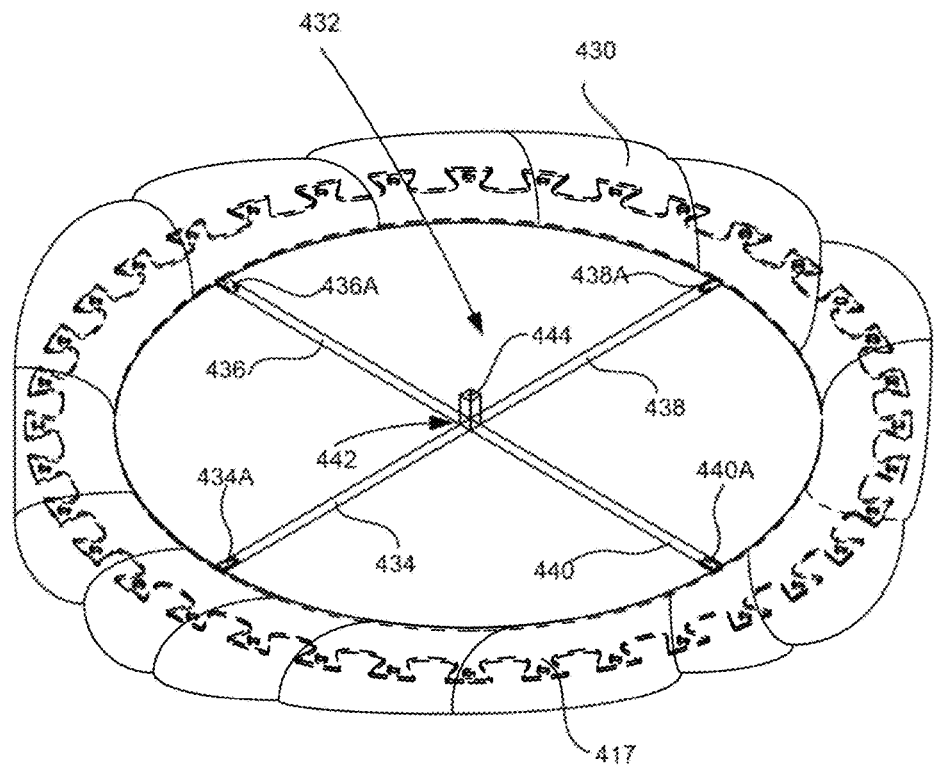
FIG. 5 is an example of an injection mold system according to aspects of the disclosure.
Figure 6:
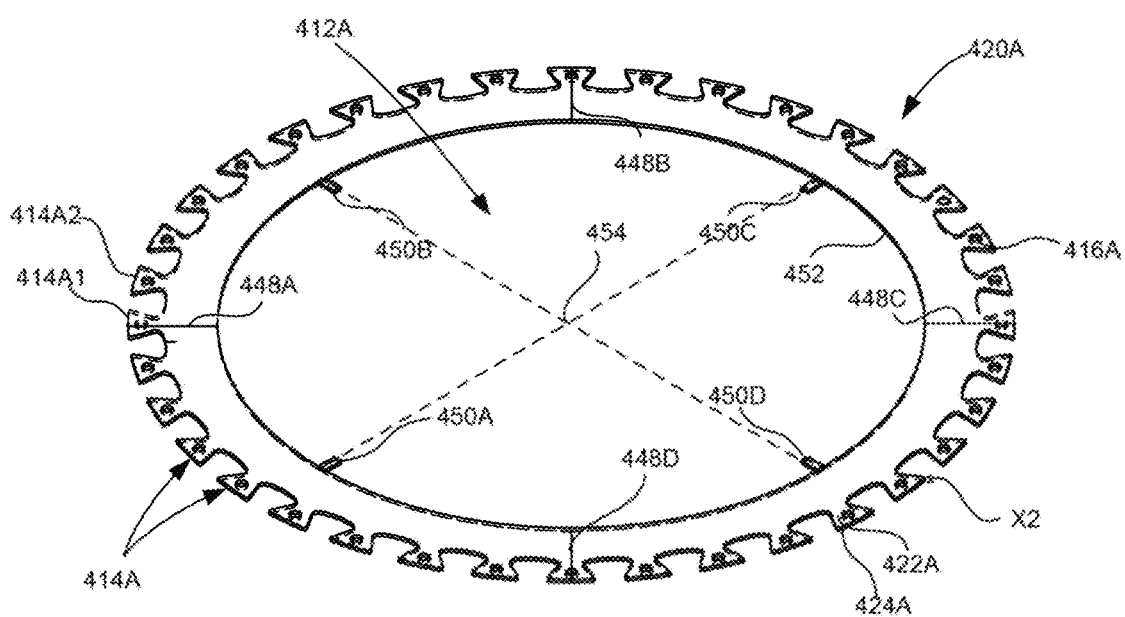
FIG. 6 is a perspective view of an example ring stacking unit according to aspects of the disclosure.

The ring stacking 420A unit can further include gate tabs 450A-D, as shown for example in FIG. 6. The gate tabs 450A-450D may possess a generally rectangular shape that may extend away from the interior edge 452 of the central opening 412A in a direction toward the center 454 of the central opening 412A of the ring stacking unit 420A. The gate tabs 450 can correspond to each of the four gate entrances 434A, 436A, 438A, 440A attached to the injection mold 430 as shown in FIG. 5. In other words, the gate tabs may result from the juncture of the four gates 434, 436, 438, 440 and the injection mold 430. In other examples, there may be less than four gate tabs or greater than four gate tabs, or no gate tabs at all. The gate tabs 450A-450D can further be removed before, after, or during assembly of the load ring 412. In other examples, the gate tabs can have a different shape.

Weld lines may also be formed along the ring stacking unit 420A. As previously noted, the weld lines occur at the point where the two or more flow fronts introduced through two or more gates into the mold meet with one another. In this example where the gates are evenly spaced around the circumference of the load ring, weld lines can appear approximately half-way between two different gates. As shown, four weld lines are disposed within the ring stacking unit 420A. Weld line 448A is positioned between gate tab 450A and gate tab 450B; weld line 448B is positioned between gate tab 450B and gate tab 450C; weld line 448C is positioned between gate tab 450C and gate tab 450D; and weld line 448D is positioned between gate tab 450D and gate tab 450A. In other examples, where the gates have a different spacing, the weld lines 448A-448D can be positioned on different points of the ring.

Figure 7:
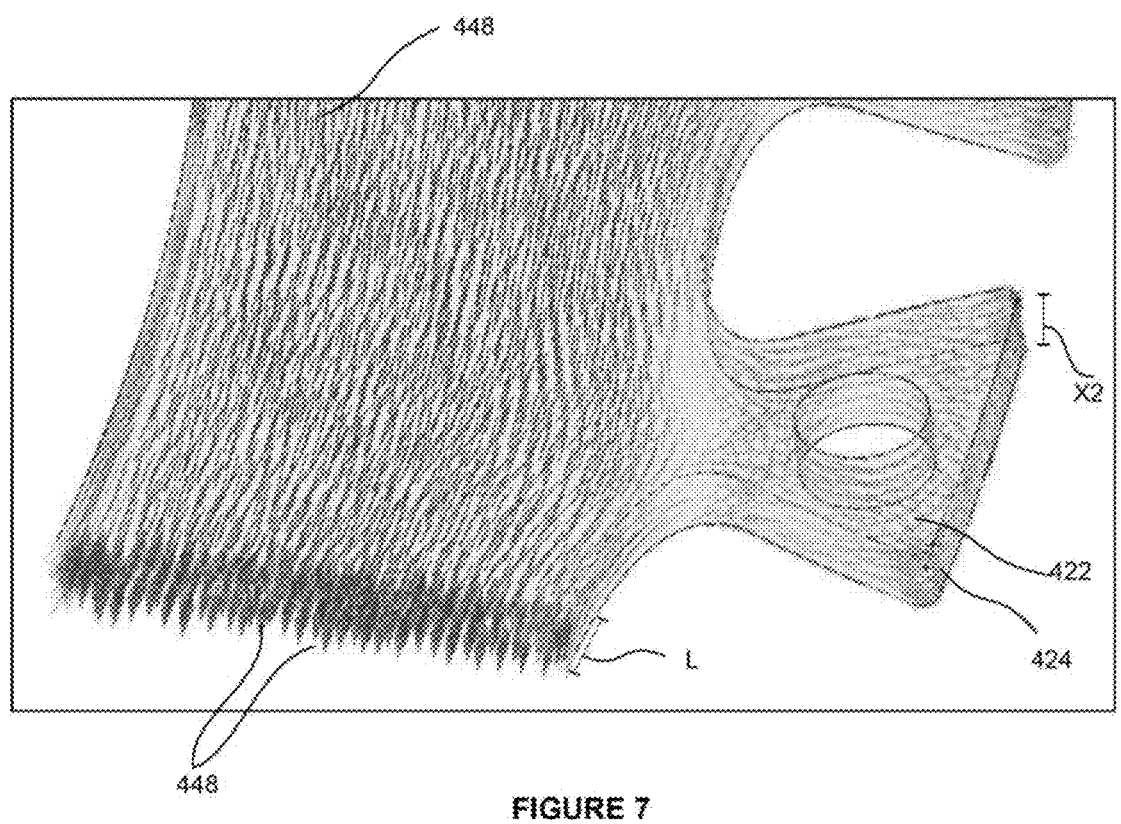
FIG. 7 is an enlarged view of a portion of an individual load ring according to aspects of the disclosure.

The ring stacking unit may have a circumferential tensile strength of at least 100 MPa. In other examples, the strength may range between 30 MP and 200 MPa. The orientation of the fibers in the material forming the ring stacking units 420 can contribute to increasing the circumferential tensile strength. As shown in FIG. 7, an enlarged view of fibers orientated within the ring stacking unit 420A, the fibers 448 of the ring stacking unit are oriented in substantially the same direction. This orientation can result, in part, from manufacturing the ring stacking unit 420A to have a thickness, such as the thickness X2 between the top and bottom surfaces 422,424, that minimizes the ability of the fibers 448 within the material to rotate and move through multiple axes. The length L or longest dimension of the fibers 448 may extend laterally along a plane P that is parallel to the top surface 422A and bottom surface 424A of the ring stacking unit 420. In addition, the length L of the fibers 448 can be aligned circumferentially around the ring. In other examples, a majority of the fibers in the ring stacking unit may be oriented in the same direction or alternatively approximately 25% or more of the fibers may be oriented in the same direction.

Figure 8:
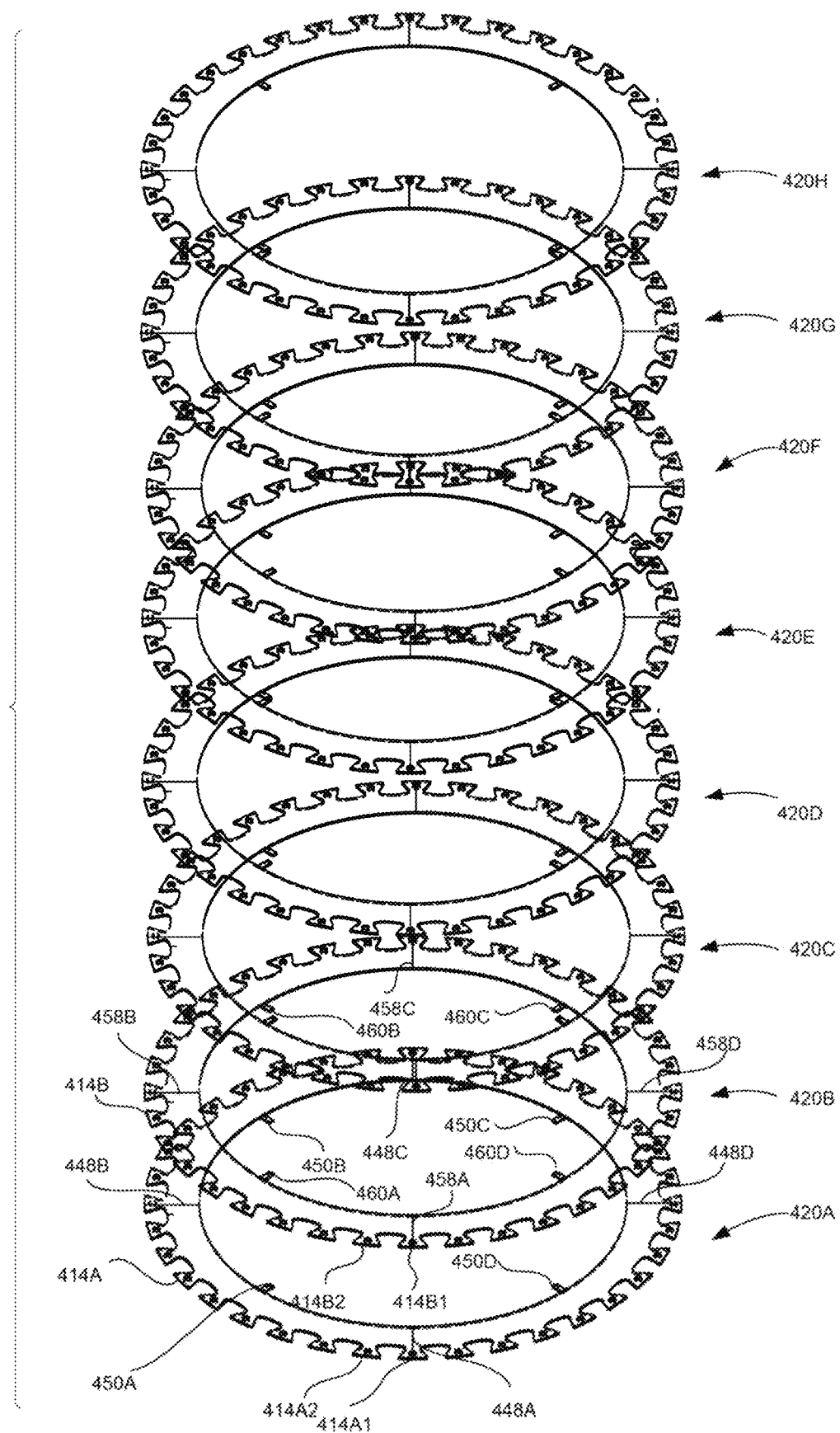
FIG. 8 is an exploded view of the components of FIG. 11.

The ring stacking unit 420A can be a first ring stacking unit 420A stacked with other ring stacking units that will together form the load ring 410 of FIG. 4. In one example, as shown in FIG. 8, which is an exploded view of FIG. 11, the ring stacking unit 420A, as well as a plurality of other substantially identical individual ring stacking units 420B-H can be provided. In this example, each of the ring stacking units 420B-420H are identical to ring stacking unit 420A and may be injection molded. Each of the ring stacking units 420B-420H can include weld lines and gate tabs that are formed in a same location along the respective ring stacking unit. For example, weld lines 458A-458D, gate tabs 460A-460D and a plurality of arms 414B, including first and second arms 414B1 and 414B2, extending around the circumference of the second ring stacking unit 420B are positioned along the same location of the ring stacking unit 420B as each of the weld lines 448A-448D, gate tabs 450A-450D and plurality of arms 414A of the first ring stacking unit 420A. Respective weld lines, gate tabs and arms of each ring stacking unit 414C-E can also be aligned with the weld lines, gate tabs and arms of the first ring stacking unit 420A. In other examples, the features of one or more ring stacking units 420B-420H may differ from ring stacking unit 420A.

In one method of assembly, the ring stacking units are stacked one ring stacking unit at a time. For example, the first and second ring stacking units 420A, 420B can be first stacked together. The second ring stacking unit 420B can initially be aligned with the first ring stacking unit (as shown in FIG. 7) so that each of the weld lines 458A-458D and gate tabs 460A-460D of the second ring stacking unit 420B are aligned with each of the weld lines 448A-448D and gate tabs 450A-450D of the first ring stacking unit. This will also cause the first arm 414B1 of the plurality of arms 414B of the second ring stacking unit 420B to be aligned with the first arm 414A1 of the plurality of arms 414A of the first ring stacking unit 420A.

Figure 9:
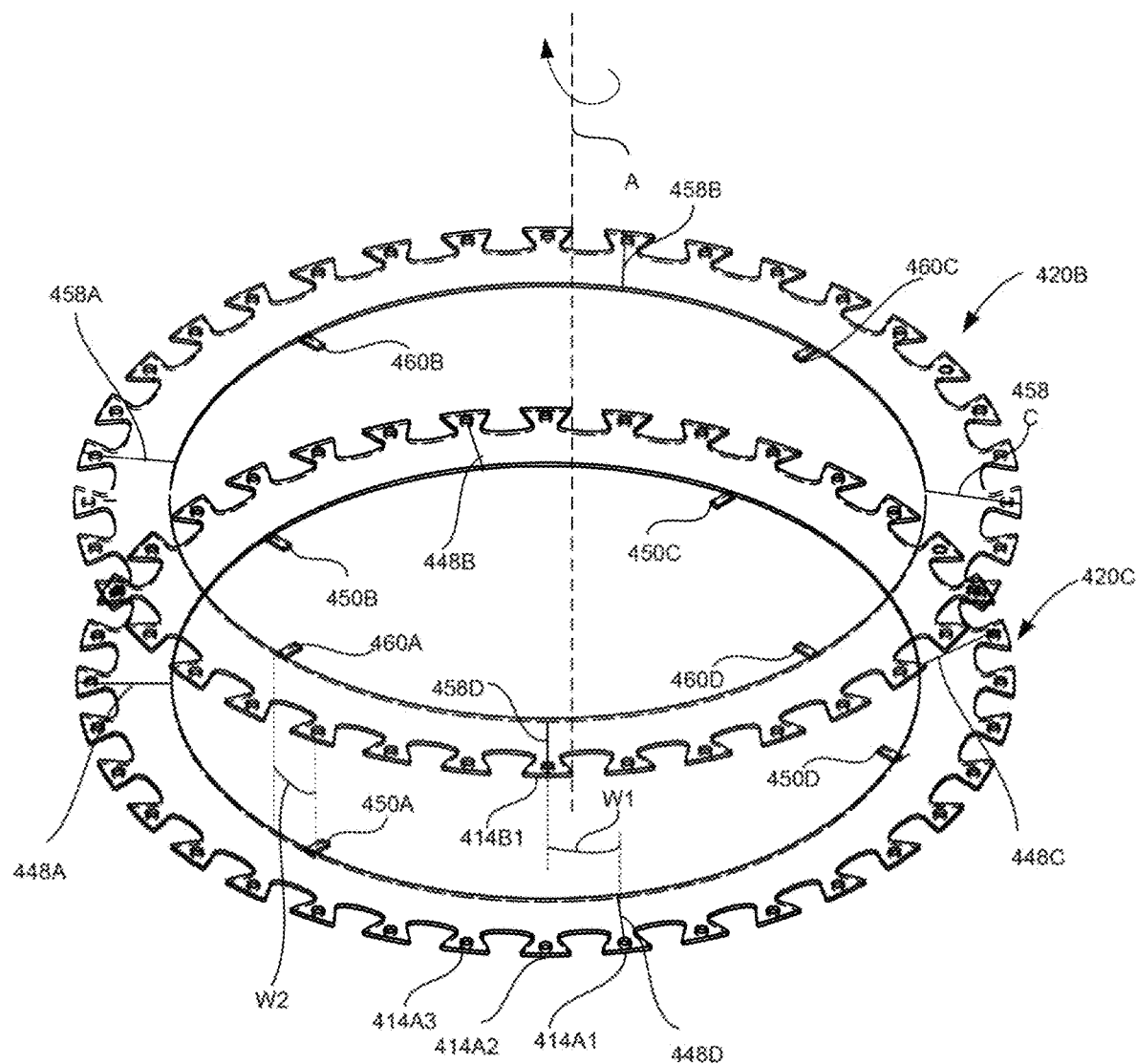
FIGS. 9-10 illustrate method steps of manufacturing a load ring according to aspects of the disclosure.

In some examples, the ring stacking units can offset from one another or rotated relative to one another during the staking. For instance, the second ring stacking unit 420B can be rotated relative to the first stacking unit so that the weld lines and gate tabs of the second ring stacking unit 420B do not align with a weld line and gate tab of a directly adjacent first ring stacking unit 420A. As shown, for example in FIG. 9, the second ring stacking unit 420B is shown being positioned on top of the directly adjacent ring stacking unit 420A. Ring stacking unit 420B is shown rotated around a central axis A, which can extend through the center of the first and second ring stacking units, relative to the first ring stacking unit 420A, such that weld line 458D of the second ring stacking unit is no longer aligned with the weld line 448D. In this example, weld line 458D of the second ring stacking unit 420B and weld line 448D of the first ring stacking unit 420A are offset by an amount W1 relative to the first ring stacking unit 420A, as well as along the circumference of the first ring stacking unit 420A. In this example, W1 may be approximately 5 degrees. In other examples, W1 can be any desired amount, such as an amount that ranges between 1-45 degrees. The degree to which the two weld lines are offset from one another can also vary based upon how many weld lines are present on the ring stacking unit. If only two weld lines are equally spaced apart from one another on a circular ring, the second weld line can be offset relative to the first ring anywhere between 1 and 89 degrees. Although not shown, the remaining weld lines 458B, 458C, 458D of the second ring stacking unit can be similarly offset the same distance W1 from the respective weld lines 448B, 448C, 448D of the first ring stacking unit 420A. Positioning the weld lines of the second ring stacking unit so that they do not align with the weld lines of the directly adjacent first ring stacking unit 420A can help to offset the weakened areas within the final laminated load ring due to the weld lines.

The rotation may also be used to account for the location of the plurality of arms of each of the ring staking units. For instance, the second ring stacking unit 420B can also be rotated relative to the directly adjacent stacking unit 420A by an amount that allows for the plurality of arms 414B of the second ring stacking unit 420B to align with the plurality of arms 414A of the first ring stacking unit 420A. As shown in this example, second ring stacking unit 420B can be rotated to position first arm 414B1 of the plurality of arms 414B of the second ring stacking unit 420B to align with the second arm 414A2 of the plurality of arms 414A of the first ring stacking unit 420A. In such example, the first arm 414B1 of the second ring stacking unit 420B can be moved out of alignment with the first arm 414A1 of the first ring stacking unit 420A1 and aligned with the second arm 414A2 of the first ring stacking unit. Since the first arm 414B1 includes weld lines 458D, first arm 414B1 can also be moved a distance W1 of at least 5 degrees. This rotation can also cause the weld line 458D of the second ring stacking unit 420B to be offset from the weld line 448D of the first stacking unit 420A. Each of the remaining plurality of arms 414B of the second ring stacking unit 414B, which can be evenly spaced around the ring stacking unit 414B, can also align with the plurality of arms 414A of the first ring stacking unit 420A. In still other examples, the second ring stacking unit 420B can move the distance between two or more arms. For example, the second ring stacking unit 420B can be rotated so that arm 414B of the second ring stacking unit aligns with arm 414A3 of the first ring stacking unit 420A, or moves the distance between length of two arms. In such example, both the arms and the weld line are moved approximately 10 degrees. In other examples, where the arms are spaced greater than or less than 5 degrees apart from one another, the second ring stacking unit 420B can be rotated any amount that will allow for alignment of the arms of the second ring stacking unit 420B with the first ring stacking unit 420A.

The rotation may also prevent interference between two or more gate tabs of different ring stacking units. For instance, rotation of the second ring stacking unit 420B can also cause the gate tabs of the second ring stacking unit to be offset relative to the gate tabs of the first stacking units. As shown, gate tab 460A of the first ring stacking unit 420A is offset relative to gate tab 450A of the second ring stacking unit 420B. Similarly, gate tabs 450B, 450C, and 450D will each be offset relative to the directly adjacent gate tabs 440B, 440C, and 440D of the first ring stacking unit 420A. The gate tabs of the first ring stacking unit 420A can also be offset relative to the gate tabs of the second ring stacking unit 420B by a distance W2. Since the gate tabs are fixed, the gate tabs can move a distance W2 and be offset from the first gate tab 450A of the first ring stacking unit by an amount W2 that is equal to W1.

Figure 10:
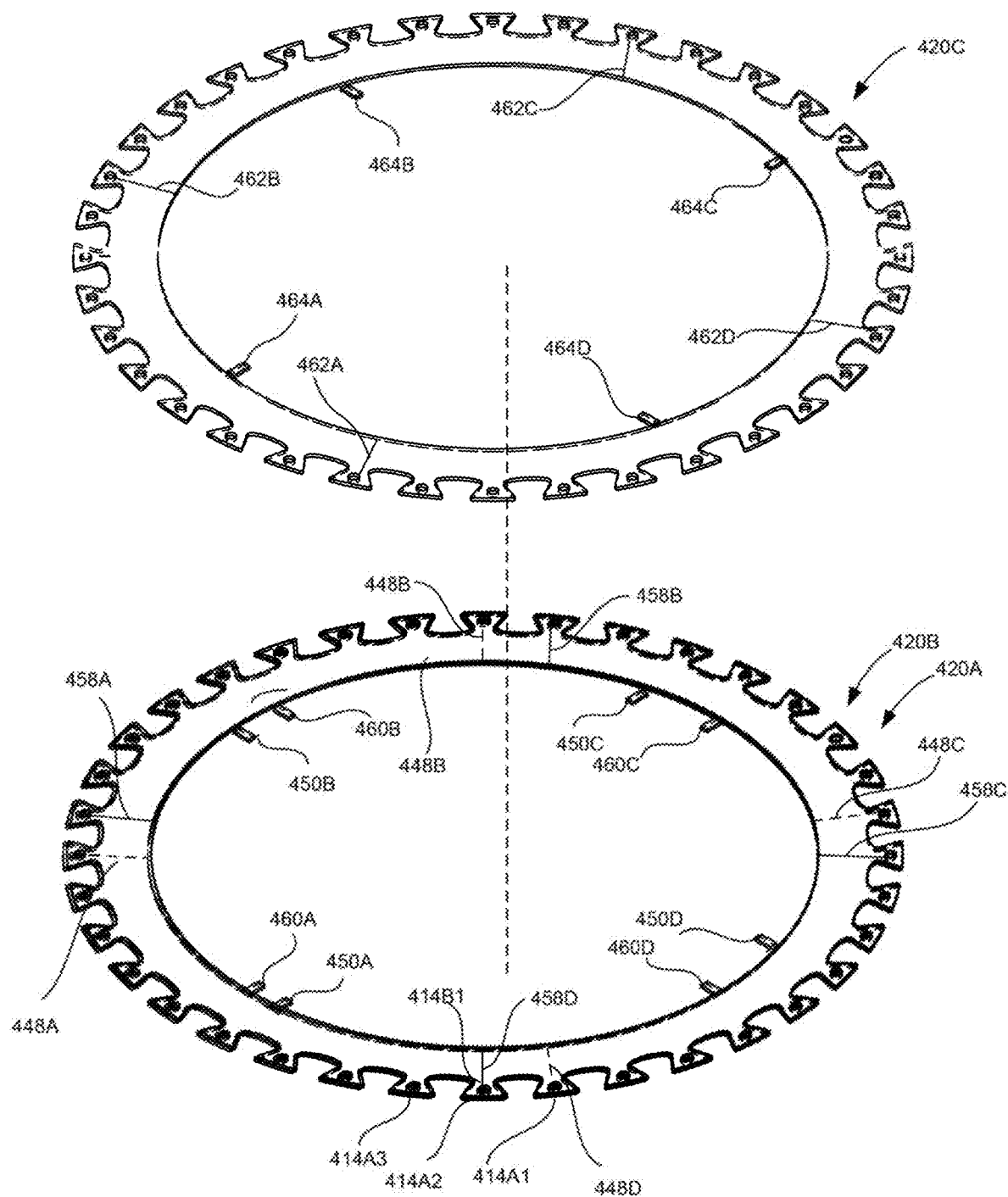

FIG. 10 provides an example of another stage of assembly where the third ring stacking unit 420C is stacked on top of the first and second ring stacking units 420A, 420B. As shown, the second ring stacking unit 420B has been stacked on top of the first ring stacking unit 420A. The gate tabs 460A-460D of the second ring stacking unit 420B are offset relative to the weld lines 448A-448D of the first ring stacking unit 420A. Gate tabs 460A-460D of the second ring stacking unit 420B are also offset relative to the gate tabs 450A-450D of the first ring stacking unit 420A. The third ring stacking unit 420C can be rotated relative to the directly adjacent second ring stacking unit 420B. As with regard to the stacking of the first and second ring stacking units 420A, 420B, the third ring stacking unit 420C may be rotated relative to the second rings stacking unit 420B so that the weld lines 462A-D of the third ring stacking unit 420C do not align with the weld lines 458A-458D of the directly adjacent ring stacking unit, which is the second ring stacking unit 420B. Additionally, the gate tabs 464A-464D of the third ring stacking unit 420C can be offset relative to the gate tabs 454A-D of the directly adjacent second ring stacking unit 420B, as well as the gate tabs 450A-D of the first ring stacking unit 420A.

Figure 11:
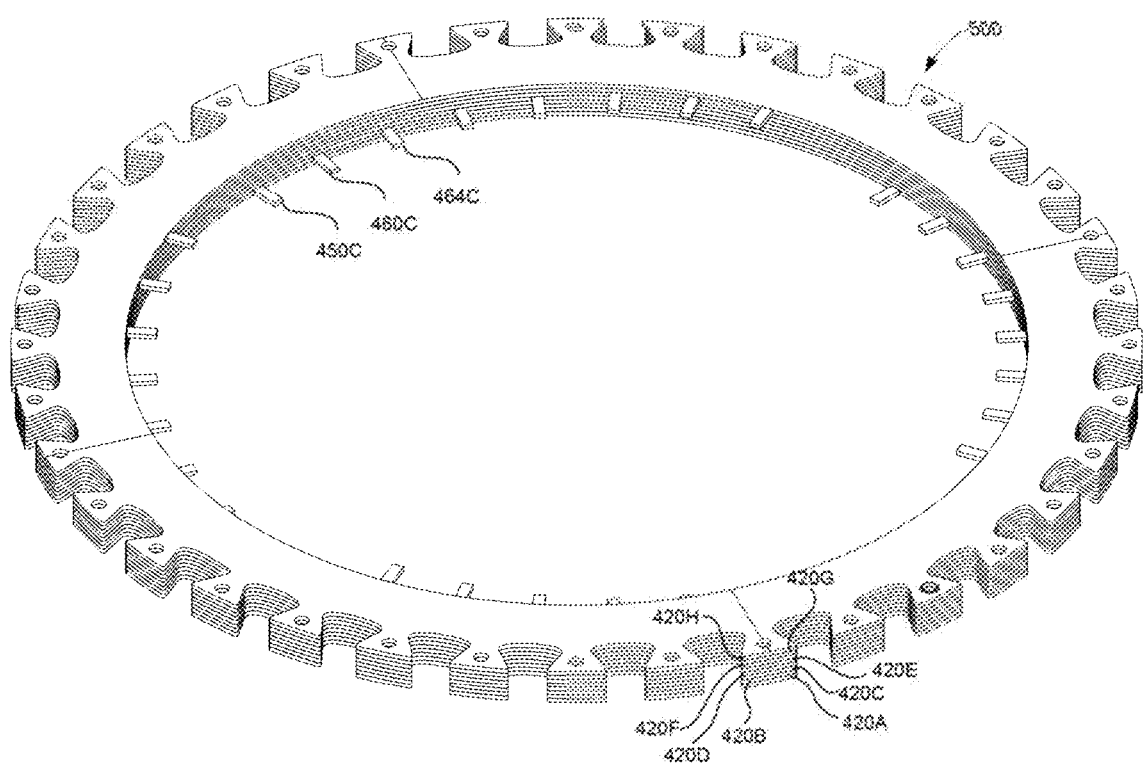
FIG. 11 illustrates a perspective view of an in-process load ring unit according to aspects of the disclosure.
Figure 12:
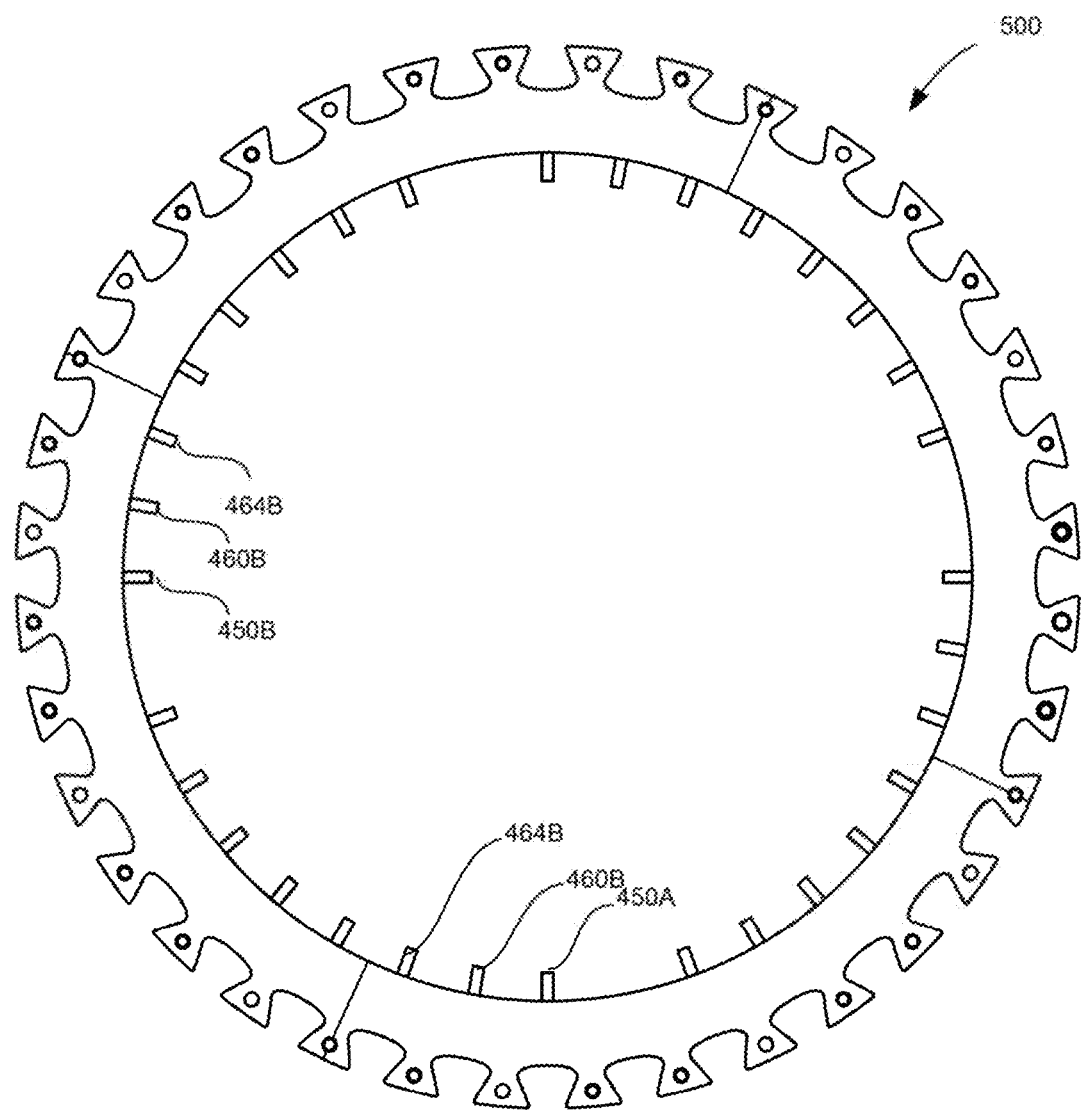
FIG. 12 is a top plan view of FIG. 11.

During the assembly process, the gate tabs can provide a visual representation that the weld lines, which are positioned half way between each of the gate tabs, are offset relative to one another, as shown in FIGS. 11 and 12. Since the gate tabs are adjacent each of the weld lines, a visual inspection of the arrangement of the gate tabs can ensure that the weld lines are offset from one another and evenly staggered or distributed around the central opening. This is because in this example, the weld lines of a particular ring stacking unit are positioned at a fixed distance approximately 45 degrees away from each of the gate tabs of the particular ring stacking unit. This can allow for quick and easy assembly of the laminated load ring. However, numerous other methods and procedures for positioning directly adjacent ring stacking units can be implemented so that the weld lines of a ring stacking unit do not align with the weld lines of the directly adjacent ring stacking unit.

Any number of additional ring stacking units may be added to form a fully assembled load ring. Assembly of a laminated load ring can be completed when the desired number of ring stacking units have been stacked together and any processing required to complete the load ring is concluded. For example, eight ring stacking units can be assembled together to form the laminated load ring 412 of FIG. 4. Until assembly and processing of the laminated load ring is completed, interim in-process units can be formed. As shown, for example in FIGS. 11-12, an in-process unit 500 includes the eight rings stacking units 420A, 420B, 420C, 420D, 420E, 420F, 420G, and 420H stacked one on top of another. As noted above, gate tabs for each of the individual load rings are shown evenly spaced around the ring, which visually indicates to a user that the weld lines are also evenly spaced around the ring.

As noted above, in some cases, once the ring staking units are stacked, the gate tabs can be removed. For instance, the gate tabs of the in-process unit 500 and particularly the gate tabs of each of the ring stacking units 420A-420H can be removed to form the completed and laminated load ring 410. Additional finishing procedures can be further completed, such as sanding the edges of the ring stacking units 420 to form a smooth edges, removing excess adhesive, and the like. As previously noted, in other examples, the in-process unit may not include gate tabs, and may simply include an interim unit that includes two or more stacked ring stacking units. Similarly, the in-process unit may include two or more stacked ring stacking units that include the same or different features and that are in a stage of assembly prior to the completion of the finished load ring.

The individual ring stacking units that form the laminated load ring may be secured together by various types of bonding. The bonding may occur during assembly, after assembly, or both. For example, during assembly, an adhesive layer may be provided between each adjacent ring stacking unit 420. In this regard, an adhesive material may be applied to the bottom surface of a ring stacking unit 420 and the top surface of a directly adjacent ring stacking unit 420 to form the adhesive layer, or alternatively a top surface and bottom surface of respective two adjacent ring stacking units 420 to form the adhesive layer. Alternatively or additionally, ultrasonic welding or other means of bonding may be used during assembly, as well as after assembly of the ring stacking units 420 into the laminated load ring.

Figure 13:
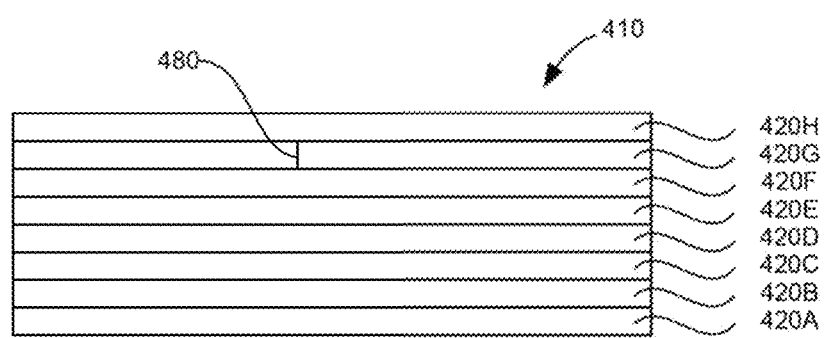
FIG. 13 is a cross-sectional view taken across line A-A in FIG. 4.

Once the finishing procedures are completed, the load ring is completed. For instance, the completion of the finishing procedures, such as removal of the gates from each of the ring stacking units 420A-420I, polishing edges of the individual ring stacking units 420A-420I, and any other finishing procedures are completed, may result in the load ring 412 of FIG. 4. As shown in FIG. 4, the load ring includes the finished ring stacking units 420A'-420I', which are substantially similar to the ring stacking units 420A-420I, except the ring stacking units 420A-420I have been further processed to form the completed load ring 410. For example, the respective gates of the ring stacking units 420A-420I have been removed. As the weld lines of each of the ring stacking units 420A-420H have been offset relative to one another, only one weld line, if at all, will appear along a cross section of the laminated load ring 412. For example, as shown in the cross-sectional view of FIG. 13, taken along line A-A of FIG. 4, only one weld line 480 of ring stacking unit 420G appears in a cross-section, due to the rotation of the directly adjacent ring stacking units 420A-420I, which in turn offsets the weld lines of each directly adjacent ring stacking unit.

The load ring 410 can provide for an increased circumferential strength. For example, if an individual ring stacking unit fails at a hoop (circumferential) loading of 2400 N and if an eight ring assembly is formed without offsetting the weak points, the eight ring assembly fails at a hoop loading of 19200 N or eight times 2400 N. The laminated load ring can carry a greater load, however, when the weak points are offset. In some examples, the load can be greater than the sum total of the strength of each individual stacking ring, and in some examples may be three times greater than the sum total of the strength of the individual stacking rings. In this example, the hoop strength can be at least up to 57,600 N (or three times 19,200 N).

Figure 14:
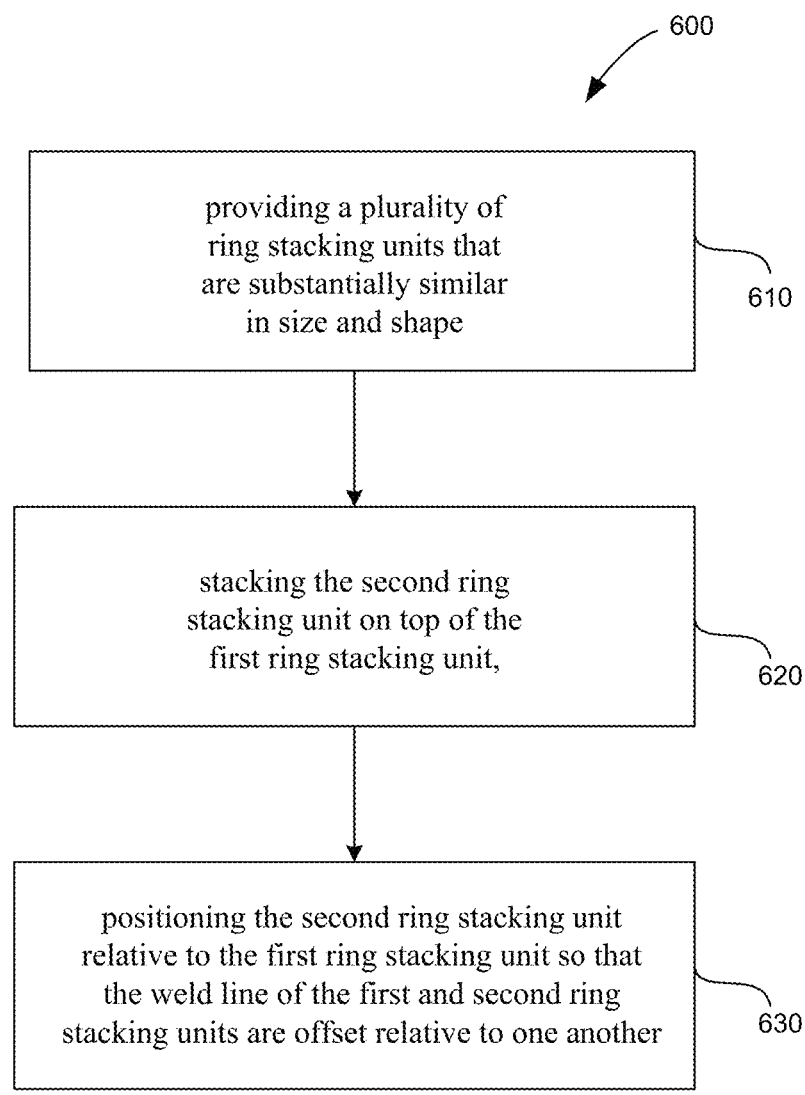
FIG. 14 is an example of a flow diagram in accordance with aspects of the present disclosure.

To better aid in understanding an example of some of the aspects described above, reference is now made to example flow diagram 600 of FIG. 14. As previously discussed, the following operations do not have to be performed in the precise order described below. Rather, as mentioned above, various operations can be handled in a different order or simultaneously, and operations may be added or omitted.

In block 610, a plurality of ring stacking units may be provided. Each of the ring stacking units may be substantially similar in shape and size. Each of the ring stacking units may further include a main body having an opening, an interior edge extending around the opening, a plurality of arms extending around an exterior edge of the ring stacking unit, and a weld line in the main body of the ring stacking unit.

In block 620, a second ring stacking unit of the plurality of ring stacking units may be stacked on top of a first ring stacking unit of the plurality of ring stacking units.

In block 630, the second ring stacking unit may be arranged so that the weld line of the second ring stacking unit is offset relative to the first ring stacking of the first ring stacking unit in a direction extending around a circumference of the first ring stacking unit.

All ranges recited herein include the endpoints, including those that recite a range "between" two values. Terms such as "about," "generally," "substantially," and the like are to be construed as modifying a term or value such that it is not an absolute, but does not read on the prior art. Such terms will be defined by the circumstances and the terms that they modify as those terms are understood by those of skill in the art. This includes, at very least, the degree of expected experimental error, technique error and instrument error for a given technique used to measure a value.

It should be further understood that a description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.3, 3, 4, 5, 5.7 and 6. This applies regardless of the breadth of the range.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same or similar reference numbers in different drawings can identify the same or similar elements.

The invention claimed is:

1. An in-process load ring unit for a balloon assembly, the in-process unit comprising:
   a plurality ring stacking units stacked one on top of the other, wherein each one of the of the plurality of ring stacking units includes a main body having a central opening and an interior edge forming a periphery around the central opening; and
   a plurality of gate tabs, each of the plurality of gate tabs extending away from the interior edge of each ring stacking unit, and wherein each of the plurality of gate tabs are spaced apart from a directly adjacent gate tab in a direction extending around a circumference of the in-process unit.

2. The in-process unit of claim 1, wherein each of the plurality of gate tabs are evenly spaced apart from one another.

3. The in-process unit of claim 1, wherein each of the plurality of gate tabs extend continuously from the main body.

4. The in-process unit of claim 1, wherein the gate tabs have a thickness that is a same thickness as a thickness of the main body.

5. The in-process unit of claim 1, wherein a thickness of each ring stacking unit is at least 0.060 inches.

6. The in-process unit of claim 1, wherein each of the ring stacking units comprises from a fiber-reinforced material.

7. The in-process unit of claim 6, wherein a majority of the fibers in each ring stacking unit are oriented in a lateral direction extending in a direction parallel to a top surface of the ring stacking unit.

8. The in-process unit of claim 1, wherein each of the ring stacking units further comprises at least one gate tab positioned within the central opening, wherein the at least one gate tab of each of the plurality of ring stacking units is offset by at least five degrees from the at least one gate tab of a directly adjacent ring stacking unit and in a direction extending around the circumference of the in-process unit.

9. The in-process unit of claim 1, further comprising an adhesive layer between each of the plurality of ring stacking units.

10. The in-process unit of claim 1, wherein the plurality of ring stacking units is bonded together.

11. A method of forming a laminated load ring comprising:
    providing a plurality of ring stacking units, each of the ring stacking units including a main body having an opening, an interior edge extending around the opening, a plurality of arms extending around an exterior edge of the ring stacking unit, and a guide line in the main body of the ring stacking unit;
    stacking a second ring stacking unit of the plurality of ring stacking units on top of a first ring stacking unit; and
    arranging the first and second ring stacking units so that the guide line of the second ring stacking unit is offset relative to the first ring stacking unit in a direction extending around a circumference of the ring stacking unit.

12. The method of claim 11, wherein each of the guide lines of the plurality of ring stacking units is a weld line.

13. The method of claim 11, wherein the step of providing further comprises forming a shape of the plurality of ring stacking units from an injection mold filled with a fiber-reinforced material.

14. The method of claim 13, wherein a majority of the fibers in each ring stacking unit of the plurality of ring stacking unites are oriented in a lateral direction extending in a direction parallel to a top surface of the ring stacking unit.

15. The method of claim 13, wherein each of the fibers in the fiber-reinforced material are oriented in a same direction when the injection mold is filled with the fiber reinforced material.

16. The method of claim 11, wherein the plurality of arms of the second ring stacking unit are aligned with the plurality of arms of the first stacking unit, the method further comprising stacking a third ring stacking unit of the plurality of ring stacking units on top of the second ring stacking unit so that the guide line of the third ring stacking unit does not align with the guide line of the second ring stacking unit.

17. The method of claim 11, wherein each of the ring stacking units further comprises at least one gate tab positioned within the opening, wherein the arranging results in each at least one gate tab of each of the plurality of ring stacking units being offset by at least five degrees from the at least one gate tab of a directly adjacent ring stacking unit in a direction extending around the circumference of the laminated load ring.

18. The method of claim 11, further comprising, bonding the plurality of ring stacking units together.

19. The method of claim 18, wherein bonding includes ultrasonic welding.

20. The method of claim 11, further comprising placing an adhesive layer between pairs of the plurality of ring stacking units.

* * * * *